United States Patent Office 2,748,057
Patented May 29, 1956

2,748,057

CATION EXCHANGE MATERIALS AND THEIR PREPARATION

Mayer B. Goren, Oklahoma City, Okla., assignor to Kerr-McGee Oil Industries, Inc., a corporation of Delaware No Drawing. Application March 16, 1953,
Serial No. 342,728

20 Claims. (Cl. 196—22)

This invention relates to carbonaceous cation exchange materials having improved properties and to the preparation of such materials. More particularly, this invention is concerned with the preparation of carbonaceous cation exchange materials that have high exchange capacities in both the hydrogen and alkali metal cycles.

The characteristics that are desirable in a satisfactory cation exchange material which is to be used for softening or deionizing water containing dissolved contaminants may be summarized as follows:

1. High exchange capacity per unit volume or weight of the material.
2. Physical stability; i. e., resistance toward attrition and fining during use. The particles should be mechanically fairly hard and have good resistance toward crushing as determined empirically by a "feel" test or more accurately through controlled attrition tests in a suitable apparatus such as a ball mill.
3. Freedom from color throw-off; i. e., the material should be relatively insoluble and show a minimum tendency to dissolve in water with which it is in contact.
4. It should not show an excessive adsorptive capacity for the regenerant; i. e., washing out of the excess of acid or salt used in regenerating the cation exchange material should be quickly and easily achieved so that large quantities of wash water are not needed.

The preparation of carbonaceous cation exchange materials has been described in a number of patents and publications. These materials are generally prepared by treatment of a carbonaceous material such as bituminous coal, peat, lignite, etc., with a sulfonating agent such as concentrated sulfuric acid, oleum or gaseous sulfur trioxide to effect sulfonation and thereby introduce on a relatively insoluble lattice, reactive groups that are capable of undergoing exchange reactions with cations in the solution. Such sulfonated products possess the above-enumerated desirable properties to varying degrees and many have proved highly satisfactory for softening or deionizing water.

By the term "asphalt-type bituminous materials" as used hereinafter in the specification and claims is meant semi-solid to solid pyrogenous and naturally occurring asphalts (bitumens and pyrobitumens), one or more semi-solid to solid fractions or components thereof, or semi-solid to solid products obtained by blowing these materials or one or more of their components or fractions with air or an oxygen containing gas in the presence or absence of catalysts. Examples of such materials include gilsonite, grahamite, wurtzilite, albertite, elaterite, native asphalts, such as Trinidad asphalt, etc. Blown asphalt-type bituminous materials include those blown with air or an oxygen containing gas either in the presence or absence of catalysts such as phosphorous pentoxide, ferric chloride, cobaltic salts, etc. By the term "components" or "fractions" of pyrogenous and naturally occurring asphalts is meant asphaltenes, resin and oil mixtures, and separate resin and oil fractions. These may be obtained, for example, by the method as described in copending application Serial No. 218,480, filed March 30, 1951.

These asphalt-type bituminous materials possess solubility, hardness, and reaction characteristics which make them desirable as starting materials for the preparation of cation exchange materials. A further advantage to be offered in the processing of such asphalt-type bituminous materials as compared with the processing of coals or related bituminous substances is that the former are fusible and no loss of fines occurs in the grinding of the material prior to sulfonation since the fines can be melted, cast and reground. This would be reflected therefore in a lower cost of production and therefore a lower cost for the product.

The sulfonation of asphaltenes for the production of ion exchange materials has been mentioned in French Patent 831,917 of 1938. This patent does not give a specific example of the sulfonation of asphaltenes although it does illustrate the sulfonation of a petroleum pitch (M. P. 110° C.) with 100% sulfuric acid in the presence of sodium dichromate. This product is said to have a capacity of 46 grams calcium ion per kilogram. Upon applying this method of sulfonation to asphaltenes, it has been found that the resultant product exhibits an exchange capacity of ten grams of calcium ion per kilogram of product. Twelve grams of the sample on regeneration with 50 milliliters (ml.) of 0.4 N-hydrochloric acid deionizes 750 ml. of hard water containing 400 p. p. m. hardness calculated as calcium carbonate. From this, it is apparent that although mention is made by this French patent of asphaltene sulfonation for producing cation exchange materials, the sulfonated asphaltenes resulting from the only sulfonation method taught by this patent are unsatisfactory. A clue to the reason for the misleading statements made in this patent relative to sulfonated asphaltenes is apparent upon considering the prohibitive wash requirement of the product. Thus, the product after washing to neutrality, conversion to the sodium cycle by treatment with sodium chloride, and regeneration with an appropriate quantity of acid, required washing with 870 ml. of distilled water before the effluent was neutral to Congo red indicator. Therefore, if the product is not washed completely, it would appear to be of very high capacity. Furthermore, the product shows a considerable amount of color throw-off in both the acid and sodium cycle, presumably owing to oxidative degradations incurred in the sulfonation reaction.

U. S. Patent 2,382,334 describes a process for the preparation of cation exchange materials by sulfonating wood, lignite, peat, bituminous coal and similar materials with a concentrated liquid sulfonating agent, thereafter washing and drying this product and resulfonating with sulfur trioxide gas. This treatment is said to produce a product of high exchange capacity without adversely affecting the hardness or color-throwing characteristics of the material.

When the sulfonation method of U. S. Patent 2,382,334 is applied to asphalt-type bituminous materials such as asphaltenes, gilsonite, blown asphalt and other related bituminous materials, the exchange capacity of the sulfonated product is always slightly higher than that of the once-sulfonated material but the washing characteristics are very poor, the product is extremely friable and color throw-off is very pronounced.

Accordingly, it is a principal object of the present invention to provide a sulfonated asphalt-type bituminous material of high exchange capacity, good physical stability, excellent washing characteristics, and improved color throw-off characteristics.

It is a further object of the present invention to provide a sulfonated asphalt-type bituminous material of the aforesaid type possessing these properties in the hydrogen and alkali metal cycles.

These and other objects will become more apparent from the following description of the present invention.

I have discovered that the reaction product of an asphalt-type bituminous material with concentrated sulfuric acid further reacted with oleum provides a highly satisfactory carbonaceous cation exchange material. Such doubly sulfonated products are of exceptionally high exchange capacity, possess good physical stability, have excellent washing characteristics, and possess exceptionally low color throw-off characteristics.

In accordance with the process of the present invention, an asphalt-type bituminous material is first sulfonated with concentrated sulfuric acid. In order to obtain a high degree of sulfonation, to provide a high surface area for contacting the aqueous solution to be treated with the final product and to provide a product which may be easily handled, the particle size of the asphalt-type bituminous material should be between approximately 10 and 50 mesh. This range of particle size is easily obtained by heating the material to a molten condition, allowing the same to solidify as a solid mass and then grinding and screening the material to the desired mesh size. Fines obtained as the result of this screening operation may be remelted, solidified and reground.

About 1 to 8 parts by weight of concentrated sulfuric acid for each part by weight of asphalt-type bituminous material sulfonated has proved satisfactory for the initial sulfonation step of the present invention although smaller ratios may be employed. The temperature of sulfonation is preferably maintained between 70 and 150° C. The time required for this sulfonation is usually in the neighborhood of several hours although shorter times may be used.

After initial sulfonation with concentrated sulfuric acid, the product may be washed and dried prior to subsequent sulfonation with oleum. Instead, residual acid, if any, may be drained off and the product sulfonated with oleum without the benefit of an intermediate washing and drying step. The latter procedure is preferred in that the resultant product is handled less by eliminating the washing and drying step and thus, the once-sulfonated material is broken up less. The purpose of draining off any residual acid between the concentrated sulfuric acid and oleum sulfonation steps is to reduce the amount of oleum necessary to obtain a given degree of activity. Consequently, it would be unnecessary to drain off residual acid if a larger quantity of oleum is used in the final sulfonation step.

Satisfactory products may be obtained by oleum sulfonation of the once-sulfonated material when approximately 2 to 10 parts by weight of oleum are used for each part by weight of once-sulfonated asphalt-type bituminous material treated. The per cent of free $SO_3$ in the oleum employed is not critical although preferred results are obtained, for example when using a 20% oleum in place of a 10% oleum. The temperature of the oleum sulfonation preferably is maintained within the range of 70 through 150° C. Generally, oleum sulfonation of the once-sulfonated asphalt-type bituminous material may be carried out in from 1 to 3 hours although satisfactory products may be obtained in a shorter time.

Subsequent to the above-described double sulfonation treatment, the materials should be allowed to cool and then washed thoroughly to remove excess acid. A number of washing operations with water are generally necessary. Subsequent to the washing operation, the material may be dried thoroughly or it may be converted to an alkali metal cycle and washed with hot water at temperatures up to but preferably below 150° C. and then dried. This latter water washing operation may be carried out with water below its boiling point or with steam or superheated water.

The above-described washing operation in the alkali metal cycle, i. e., sodium, potassium or lithium cycle, with hot water has the particular advantage of removing a small amount of soluble material in the doubly sulfonated asphalt-type bituminous material and thereby improves its color throw-off characteristics. Consequently, where exceptionally high freedom from color throw-off is particularly desirable, this latter method of conversion to the alkali metal cycle and washing with hot water at a temperature below 150° C. is preferred. However, even though this preferred washing technique is not employed, the product obtained by removing excess acid and repeated washing with water without the conversion to alkali metal cycle is greatly improved in its color throw-off characteristics as compared with an asphaltic material resulfonated with sulfur trioxide.

The following examples are for the purpose of illustrating the present invention but are not limiting to the scope thereof which is set forth in the appended claims.

*Example I*

A vacuum-reduced asphalt of 89 penetration and a ring and ball softening point of 120° F. was treated with 10 volumes of pentane, and the precipitated asphaltenes were filtered, dried, brought to fusion by heating and allowed to solidify as a solid mass. This product was then ground and screened to obtain a 20 to 40 mesh material. Fines were remelted, solidified and reground.

100 parts by weight of the 20 to 40 mesh asphaltenes were treated with 540 parts by weight of 66° Bé. sulfuric acid in a vessel suitably equipped with an agitating means and vented for the escape of gases formed during the reaction. Heat was applied slowly to the reaction mass to bring it to a temperature of approximately 100° C. which was maintained for two hours. After cooling, the product was drained of excess acid and then carefully washed free of acid. The product of this reaction was a shiny, hard, granular material resistant to attrition.

12 grams of this product was placed in a glass column, exhausted by treatment with an aqueous sodium hydroxide solution, thoroughly washed and regenerated with dilute hydrochloric acid. Hard water containing 400 p. p. m. hardness, calculated as $CaCO_3$, was then passed through the column until the acidity of the effluent indicated a leakage of 20 p. p. m. of hardness through the column. The column was then washed, regenerated as described above, and treated with hard water again. This process was repeated a number of times to obtain a constant value of exchange capacity. In all instances, approximately 1 liter of water was required to wash out the regenerating acid and on an average the material in the column deionized about 550 ml. of the hard water prior to leakage reaching the limit defined above. Thus, the product had an average exchange capacity of about 0.36 milliequivalent per gram (meq./g.).

*Example II*

The product of Example I was further activated by treating 15 parts by weight of the dry material with 80 parts by weight of 20% oleum. The temperature was controlled by cooling and slow addition of the reagent. After the initial reaction had spent itself, the mixture was heated and maintained for two hours at or just below 100° C. The product was then washed, finally in the sodium cycle with hot water and steam, and then dried. A 12 gram sample tested in the same manner as described in Example I above required somewhat less than 100 ml. of wash water to free it of excess regenerant and the sample deionized 2,150 ml. of the standard hard water before leakage reached the limit defined above. Thus, the product had an exchange capacity of approximately 1.43 meq./g.

Example III

The product of Example I, after washing and drying, was resulfonated by treating 20 parts by weight of the same with 110 parts by weight of 10% oleum at a temperature just below 100° C. for two hours. This product was then washed and dried. In column operation, 12 grams of this material required less than 200 ml. of wash water to remove excess regenerant and deionized 1100 ml. of the standard hard water. This product therefore had a working capacity of about 0.73 meq./g.

Example IV

The once-sulfonated product as obtained in Example I, after washing and drying, was resulfonated by retreating 100 grams of this material with 360 ml. of 95% sulfuric acid at 150° C. for two hours. After cooling, the excess liquid was filtered off to recover 175 ml. of acid of density of 1.65 and the residue was thoroughly washed to remove all acid. In column operation, the materials showed improved washing characteristics (230 ml. of wash water was being required on a regenerated 12 gram sample) but the exchange capacity had improved over the exchange capacity of Example I by only approximately 10%.

Example V

A sample of gilsonite having a pressed powder ring and ball softening point of 325–330° F. was crushed and sieved to a mesh size of between 10 and 20. 100 grams of this material was sulfonated by treatment with 540 grams of 95% sulfuric acid at 100° C. for two hours and the product was then thoroughly washed and dried. In column operation as described in the previous examples, the sulfonated gilsonite exhibited very poor exchange characteristics, a very slow rate of flow being required to effect exchange and the volume of hard water deionized was 750 ml. This indicates a working capacity of approximately 0.46 meq./g. Furthermore, the material adsorbed the excess regenerant to such an extent that excessive volumes of water were needed to wash it free of acid.

Example VI 20 parts by weight of the washed and dried sulfonated product of Example V was treated with 115 parts by weight of 20% oleum and maintained at a temperature below 5° C. for one and one-quarter hours. The mixture was then allowed to warm up on its own and when the initial reaction moderated, the mixture was heated on a water bath for two hours to complete the reaction. The product was then thoroughly washed and dried. In column operation as carried out in previous examples, 10 grams of the material was washed free of excess regenerant with approximately 200 ml. of water and the regenerated product deionized 1700 ml. of the standard hard water. This indicates a working capacity of approximately 1.36 meq./g.

Example VII

A vacuum-reduced asphalt of 87 penetration and 117° F. ring and ball softening point was oxidized by blowing with a current of air for 15 hours at 500° F. The product of this oxidation had a softening point of 271° F. (ring and ball), penetration of 6 and a penetration index of +5. This blown asphalt was chilled, crushed and screened, and the 10 to 30 mesh material was retained while the fines were remelted, cast and reground. 100 grams of the sized material was contacted with 300 ml. of 95% sulfuric acid, allowed to stand overnight and then heated to 100–110° C. and maintained for two hours. After cooling, the excess acid was recovered by filtration and the residue of sulfonated product was washed completely free of acid. Evaluation for ion exchange characteristics in column operation showed that 12 grams of the material after regeneration from a sodium cycle with dilute hydrochloric acid required over a liter of wash water for removal of excess regenerant and deionized 800 ml. of the standard hard water.

Example VIII 25 grams of the washed and dried product of Example VII screened to 20 to 40 mesh was suspended in 38 ml. of 95% sulfuric acid and allowed to stand for 16 hours. An additional 20 cc. of 95% sulfuric acid was added followed by the careful addition of 58 ml. of 20% oleum. The mixture was allowed to reach its own equilibrium temperature before it was heated to water bath temperature for two hours. After cooling, the product was thoroughly washed, finally in the sodium cycle with hot water, and its ion exchange characteristics determined. After regeneration from the sodium cycle with dilute hydrochloric acid, a 12 gram sample required 115 ml. of wash water to free it of excess regenerant, and the active material deionized 1800 ml. of the standard hard water, at which point the effluent showed a leakage of 20 p. p. m. through the column. Thus, the material possessed a working capacity of approximately 1.2 meq./g. as compared with a working capacity of 0.53 meq./g. for the once-sulfonated material.

Example IX

The pentane soluble fraction of Example I comprising a mixture of oils and resins was separated from the pentane by distillation and was air-oxidized by blowing in the presence of 0.75% phosphorus pentoxide to obtain a product having a softening point of 314° F., a penetration of 5 and a penetration index of +6. This blown resin-oil mixture was sulfonated in the same manner with the same proportions of sulfonating agents as was the blown vacuum-reduced asphalt of Example VII. In column operation as carried out in previous examples, a 12 gram sample after regeneration from a sodium cycle with dilute hydrochloric acid required approximately one liter of wash water to free it of excess regenerant and deionized 800 ml. of the standard hard water prior to leakage of 20 p. p. m. through the column. This material possessed a working capacity of approximately 0.53 meq./g.

Example X

The product of Example IX was sulfonated in the same manner and with the same agents in the same proportions as was done to the product of Example VII in Example VIII. A 12 gram sample of the resultant product required about 115 ml. of wash water to free it of excess regenerant and deionized approximately 1800 ml. of the standard hard water prior to leakage of 20 p. p. m. through the column. Thus, the working capacity of this material was approximately 1.2 meq./g.

Example XI

A vacuum-reduced asphalt having a softening point of 113° F. and penetration 92 was treated with 10 volumes of liquid propane at ambient temperature in a rotating pressure vessel for two hours to attain equilibrium. After this, the propane-insoluble heavy phase was collected and freed of propane. This product had a ring and ball softening point of 180° F. To increase its hardness, it was air-blown at 530° F. for 19 hours. As a result, a product having a ring and ball softening point of 303° F. and penetration of 2 was obtained. This product was chilled, ground and screened to a mesh size of between 20 and 40 and sulfonated in the manner described in Examples VII and VIII above. After regeneration from a sodium cycle with dilute hydrochloric acid, 12 grams of the washed and dried doubly sulfonated material deionized 1550 ml. of the standard hard water as compared with 700 ml. deionized by the once-sulfonated material.

Example XII

Pentane insoluble asphaltenes as prepared in Example I were melted, cast, ground and screened to a mesh size of between 20 and 40. 25 parts of the thusly screened material was treated with 130 parts of 95% sulfuric acid and heated at water bath temperature for one and one-half hours with stirring. The mass was then allowed to cool and 145 parts of 20% oleum was added, stirred in, and the mixture was heated an additional one and one-half hours to complete the sulfonation. The product was cooled, washed thoroughly to remove excess acid, converted to the sodium cycle and washed with hot water and steam to remove a small amount of soluble material and dried. The exchange capacity was determined on a 12 gram sample regenerated from the sodium cycle with dilute hydrochloric acid. In column operation, it deionized 1250 ml. of standard hard water before the effluent showed a leakage of 20 p. p. m. hardness. The product in the column was easily washed free of excess regenerant, slightly over 100 ml. of wash water being required. Thus, the product had a working capacity of approximately 0.84 meq./g.

I claim:

1. A process of preparing a carbonaceous cation exchange material which comprises sulfonating an asphalt-type bituminous material with concentrated sulfuric acid, further sulfonating each part by weight of the resultant product with from 2 to 10 parts by weight of oleum and washing excess acid out of the resultant product.

2. A process of preparing a carbonaceous cation exchange material which comprises sulfonating an asphalt-type bituminous material with concentrated sulfuric acid, further sulfonating each part by weight of the resultant product with from 2 to 10 parts by weight of oleum, the temperatures of both sulfonation steps being maintained within the range of 70 through 150° C., and washing excess acid out of the resultant product.

3. A process of preparing a carbonaceous cation exchange material which comprises sulfonating an asphalt-type bituminous material with concentrated sulfuric acid, further sulfonating each part by weight of the resultant product with from 2 to 10 parts by weight of oleum, washing excess acid out of the resultant product, converting the washed product to an alkali metal cycle and washing with water at a temperature below 150° C.

4. A process of preparing a carbonaceous cation exchange material which comprises sulfonating an asphalt-type bituminous material with concentrated sulfuric acid, further sulfonating each part by weight of the resultant product with from 2 to 10 parts by weight of oleum, the temperatures of both sulfonation steps being maintained within the range of 70 through 150° C., washing excess acid out of the resultant product, converting the washed product to an alkali metal cycle, and washing with water at a temperature below 150° C.

5. A process of preparing a carbonaceous cation exchange material which comprises sulfonating asphaltenes with concentrated sulfuric acid, further sulfonating each part by weight of the resultant product with from 2 to 10 parts by weight of oleum and washing excess acid out of the resultant product.

6. A process of preparing a carbonaceous cation exchange material which comprises sulfonating asphaltenes with concentrated sulfuric acid, further sulfonating each part by weight of the resultant product with from 2 to 10 parts by weight of oleum, the temperatures of both sulfonation steps being maintained within the range of 70 through 150° C., and washing excess acid out of the resultant product.

7. A process of preparing a carbonaceous cation exchange material which comprises sulfonating asphaltenes with concentrated sulfuric acid, further sulfonating each part by weight of the resultant product with from 2 to 10 parts by weight of oleum, washing excess acid out of the resultant product, converting the washed product to an alkali metal cycle and washing with water at a temperature below 150° C.

8. A process of preparing a carbonaceous cation exchange material which comprises sulfonating asphaltenes with concentrated sulfuric acid, further sulfonating each part by weight of the resultant product with from 2 to 10 parts by weight of oleum, the temperatures of both sulfonation steps being maintained within the range of 70 through 150° C., washing excess acid out of the product thus obtained, converting the washed product to an alkali metal cycle and washing with water at a temperature below 150° C.

9. A process of preparing a carbonaceous cation exchange material which comprises sulfonating blown asphalt-type bituminous material with concentrated sulfuric acid, further sulfonating each part by weight of the resultant product with from 2 to 10 parts by weight of oleum and washing excess acid out of the resultant product.

10. A process of preparing a carbonaceous cation exchange material which comprises sulfonating blown asphalt-type bituminous material with concentrated sulfuric acid, further sulfonating each part by weight of the resultant product with from 2 to 10 parts by weight of oleum, the temperatures of both sulfonation steps being maintained within the range of 70 through 150° C., and washing excess acid out of the resultant product.

11. A process of preparing a carbonaceous cation exchange material which comprises sulfonating blown asphalt-type bituminous material with concentrated sulfuric acid, further sulfonating each part by weight of the resultant product with from 2 to 10 parts by weight of oleum, washing excess acid out of the resultant product, converting the washed product to an alkali metal cycle and washing with water at a temperature below 150° C.

12. A process of preparing a carbonaceous cation exchange material which comprises sulfonating a blown asphalt-type bituminous material with concentrated sulfuric acid, further sulfonating each part by weight of the resultant product with from 2 to 10 parts by weight of oleum, the temperatures of both sulfonation steps being maintained within the range of 70 through 150° C., washing excess acid out of the resultant product, converting the washed product to an alkali metal cycle and washing with water at a temperature below 150° C.

13. A process of preparing a carbonaceous cation exchange material which comprises sulfonating a blown product of an asphaltene-free asphalt-type bituminous material with a concentrated sulfuric acid, further sulfonating each part by weight of the resultant product with from 2 to 10 parts by weight of oleum and washing excess acid out of the resultant product.

14. A process of preparing a carbonaceous cation exchange material which comprises sulfonating a blown product of an asphaltene-free asphalt-type bituminous material with concentrated sulfuric acid, further sulfonating each part by weight of the resultant product with from 2 to 10 parts by weight of oleum, the temperature of both sulfonation steps being maintained within the range of 70 through 150° C., and washing excess acid out of the resultant product.

15. A process of preparing a carbonaceous cation exchange material which comprises sulfonating a blown product of an asphaltene-free asphalt-type bituminous material with concentrated sulfuric acid, further sulfonating each part by weight of the resultant product with from 2 to 10 parts by weight of oleum, washing excess acid out of the resultant product, converting the washed product to an alkali metal cycle, and washing with water at a temperature below 150° C.

16. A process of preparing a carbonaceous cation exchange material which comprises sulfonating a blown product of an asphaltene-free asphalt-type bituminous material with concentrated sulfuric acid, further sulfonating each part by weight of the resultant product with from 2 to 10 parts by weight of oleum, the temperature of both sulfonation steps being maintained within the range of 70 through 150° C., washing excess acid out of the resultant product, converting the washed product to an alkali metal cycle, and washing with water at a temperature below 150° C.

17. A carbonaceous cation exchange material comprising each part by weight of the reaction product of an asphalt-type bituminous material with concentrated sulfuric acid further reacted with from 2 to 10 parts by weight of oleum and washed free of excess acid.

18. A carbonaceous cation exchange material comprising each part by weight of the reaction product of a blown asphalt-type bituminous material with concentrated sulfuric acid further reacted with from 2 to 10 parts by weight of oleum and washed free of excess acid.

19. A carbonaceous cation exchange material comprising each part by weight of the reaction product of a blown asphaltene-free asphalt-type bituminous material with concentrated sulfuric acid further reacted with from 2 to 10 parts by weight of oleum and washed free of excess acid.

20. A carbonaceous cation exchange material comprising each part by weight of the reaction product of asphaltenes with concentrated sulfuric acid further reacted with from 2 to 10 parts by weight of oleum and washed free of excess acid.

References Cited in the file of this patent

UNITED STATES PATENTS

| | | |
|---|---|---|
| 1,459,328 | Forrest et al. | June 19, 1923 |
| 1,578,235 | Forrest et al. | Mar. 23, 1926 |
| 1,868,211 | Nobel | July 19, 1932 |
| 2,208,171 | Urbain | July 16, 1940 |
| 2,299,469 | D'Antal | Oct. 20, 1942 |
| 2,382,334 | Riley et al. | Aug. 14, 1945 |